(12) United States Patent
Galli et al.

(10) Patent No.: US 6,675,082 B2
(45) Date of Patent: Jan. 6, 2004

(54) SYSTEM AND METHOD FOR AUTOMOTIVE SYSTEMS RELATIVE POSITIONAL TRANSLATIONS

(75) Inventors: Doreen L. Galli, Smyrna, GA (US); Steven M. Miller, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/128,958

(22) Filed: Apr. 24, 2002

(65) Prior Publication Data

US 2003/0204296 A1 Oct. 30, 2003

(51) Int. Cl.[7] ............................................... G06F 7/00
(52) U.S. Cl. ..................................... 701/49; 701/36
(58) Field of Search ............................. 701/36, 45, 49; 307/9.1, 10.1; 280/728.1, 734, 735; 180/268, 271, 273

(56) References Cited

U.S. PATENT DOCUMENTS

| | | | |
|---|---|---|---|
| 5,019,759 A | 5/1991 | Takemura et al. | 318/466 |
| 5,694,259 A | 12/1997 | Brandin | 359/843 |
| 5,748,473 A | 5/1998 | Breed et al. | 364/424.005 |
| 5,798,575 A | 8/1998 | O'Farrell et al. | 307/10.1 |
| 6,078,854 A | 6/2000 | Breed et al. | 701/49 |
| 6,122,580 A | 9/2000 | Autermann | 701/49 |
| 6,134,492 A | 10/2000 | Breed et al. | 701/49 |
| 6,176,587 B1 | 1/2001 | Fredricks | 358/843 |
| 6,198,996 B1 | 3/2001 | Berstis | 701/36 |
| 6,205,374 B1 | 3/2001 | Kljima et al. | 701/1 |
| 6,230,084 B1 | 5/2001 | Kijima et al. | 701/1 |
| 6,253,134 B1 | 6/2001 | Breed et al. | 701/49 |

*Primary Examiner*—Yonel Beaulieu
(74) *Attorney, Agent, or Firm*—Gerald R. Woods; Joseph T. YanLeeuwen

(57) ABSTRACT

A system and method is provided for determining vehicle-specific settings for a user of a vehicle. Normalized positions settings in a reference vehicle, or alternatively, normalized user measurements of a reference user are stored to a storage media, such as a smart card. In this manner, a user profile is created on the storage media. The normalized position settings and normalized user measurements provide references that may be used in determining the most suitable settings for a specific user of a specific vehicle. A vehicle user thus may carry a user profile on a storage media for use across all different models and brands of vehicles. The user profile may be used to automatically adjust the settings in other vehicles than the user's primary vehicle which allows a user to change vehicles without having to take the time to re-adjust the vehicle settings.

22 Claims, 9 Drawing Sheets

SYSTEM AND METHOD FOR AUTOMOTIVE SYSTEMS RELATIVE POSITIONAL TRANSLATIONS

RELATED APPLICATION

This application is related to the following U.S. Patent Application filed on Apr. 12, 2002 and having the same inventor(s) as the present application: "System and Method for Acquiring Normalized Automotive Positional Settings" (application Ser. No. 10/122,039). The present application and the related application have each been assigned to the IBM Corporation.

BACKGROUND OF THE INVENTION

1. Technical Field

The present invention relates in general to a system and method for determining vehicle-specific settings for a user of a vehicle. Still more particularly, the present invention relates to a system and method for determining vehicle-specific settings for a user of any vehicle model by translating pre-determined normalized position settings to the vehicle-specific settings.

2. Description of the Related Art

Computer systems have become increasingly integrated with people's day-to-day lives. For example, many people keep their calendars electronically on a computer system. Another example is sending notes electronically as email rather than using postal or courier services. Computer technology has also improved consumer banking. Consumers can now transfer money and pay bills electronically without having to write and deliver checks. Even telephone systems are increasingly computerized with computers interfacing with telephone systems and configuring the telephone according to the user's preferences. Telephone control may even reside in the user's personal computer.

Computer automation has also proliferated to peoples' automobiles. For example, many people have computerized automobiles that can automatically perform functions for their primary users. These automobiles can store profiles of their primary users and adjust seat and mirror positions for a user that selects his specific profile. While this technology benefits a user of a specific automobile, it becomes useless in those situations where the user must use a different automobile. For example, it might become necessary for the user to rent a car, which would not have the user's profile stored on the rental car's computer system.

Attempts have been made to provide a means for carrying user profiles to other automobiles besides the primary automobile of a user. For example, key fobs and smart cards have been used to transport user profiles to different automobiles. A limitation of this current art is that a user profile for a specific automobile brand and model cannot be used to achieve the same results in a different brand and model. The second automobile might not be programmed to perform the same functions as the primary automobile. The two automobiles also might contain different types of components. In this case, adjustments made to the settings of the components in the second automobile would be improperly based on a user profile created from the primary automobile's settings. The resulting settings in the second automobile would thus be incompatible with the user's preferred settings in the primary automobile. As such, the user would be required to make further adjustments to the settings in the second automobile before beginning its operation.

What is needed, therefore, is a system and method for determining the settings for a user of a vehicle brand and model different than the user's primary vehicle brand and model. A system and method is desired that is capable of automatically adjusting the position settings of the components in any vehicle brand and model selected by the user. Such a system and method would enable a user to more easily adapt to rental cars and other occasional use vehicles.

SUMMARY

A system and method have been developed for determining vehicle-specific settings for a user of a vehicle. This invention contemplates using normalized position settings, or alternatively, normalized user measurements in a reference vehicle to adjust the position settings of the components in any vehicle brand and model. The normalized settings and user measurements provide references to be used in determining the settings for a specific user of a specific vehicle. The normalized settings and user measurements are saved onto storage media, e.g., smart cards or key fobs to create a "user profile" on the storage media.

Vehicle users can transport the storage media so that their user profiles may be applied to all different models and brands of vehicles. In this manner, the components in vehicles other than the user's primary vehicle, e.g., rental cars, business cars, and other occasional-use vehicles can be adjusted automatically to settings that are appropriate for the user. The invention therefore enables a user to change vehicles without having to take the time to re-adjust the vehicle settings.

In an embodiment of the invention, a system and method for determining the settings for a user of a vehicle is provided. The invention contemplates reading normalized position settings from a storage medium, such as a smart card. Translation algorithms are then retrieved from the current vehicle. The normalized position settings are thereafter translated to vehicle-specific settings using the translation algorithms. Signals are then sent to move the vehicle components to the vehicle-specific settings.

According to another embodiment, a system and method is provided for determining normalized position settings for use across different vehicle models. A user first sits in a vehicle and adjusts the vehicle components to the user's preferred settings, i.e., vehicle-specific settings. The vehicle-specific settings are retrieved from sensors positioned on the components of the vehicle. Next, the translation algorithms for the vehicle are read, and the vehicle-specific settings are translated to normalized position settings based on the translation algorithms. The normalized position settings are then stored to storage media that may be carried to other brands and models of vehicles for use in determining the appropriate settings in those vehicles.

In yet another embodiment, a system and method is provided for determining normalized user measurements for use across all brands and models of vehicles. When the user sits in a vehicle, sensors included with the vehicle can measure the user's attributes, e.g., height, weight, arm length, leg length, and torso length. These measurements can be retrieved and stored to the storage media as normalized user measurements. The vehicle-specific settings for any brand and model of vehicle may be determined based on the normalized user measurements. In this manner, the components of a vehicle may be adjusted based on the user's attributes.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
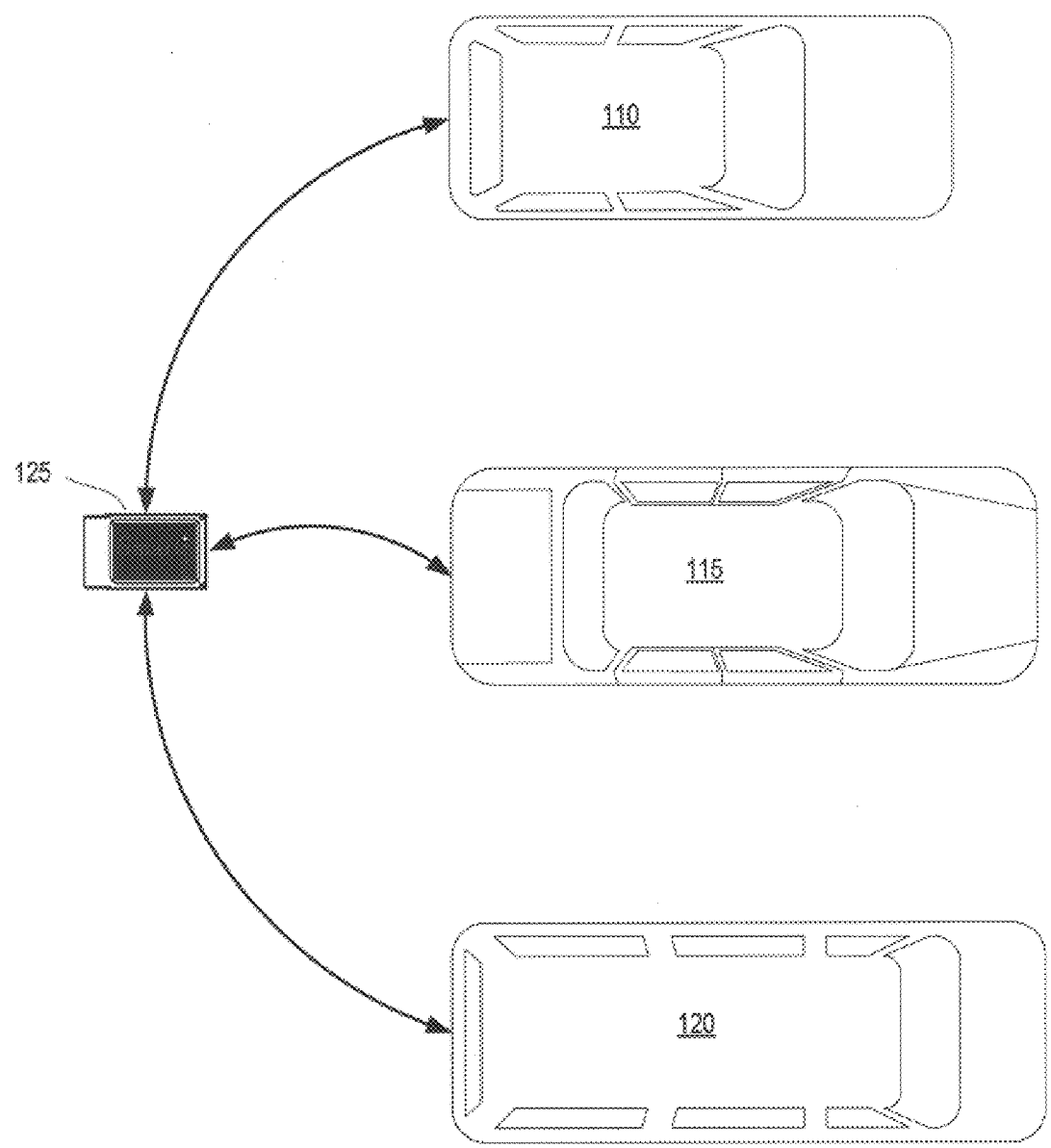
FIG. 1 is a diagram of a user carrying a smart card to different models and brands of vehicles, enabling the settings of the components in the different vehicles to be automatically adjusted to vehicle-specific settings based on a user profile stored on the smart card.

FIG. 1 is a diagram of a vehicle user carrying a smart card to different models and brands of vehicles. Vehicles 110, 115, and 120 are different models of automobiles, and the components in each of these vehicles are different in model type from the components in the other vehicles. For example, vehicles 110, 115, and 120 contain different types of steering wheels. The user may carry smart card 125 to any of the vehicles 110, 115, or 120, as shown by the arrows in FIG. 1. Various reference data, such as normalized position settings and normalized user measurements are stored on smart card 125.

After deciding which vehicle to use, the user may place smart card 125 in the chosen vehicle's card reader. Each of the vehicles 110, 115, and 120 is programmed to translate the normalized position settings stored on smart card 125 to vehicle-specific settings that are tailored for the specific user of the specific vehicle. The settings in the chosen vehicle are adjusted to the vehicle-specific settings. The smart card 125 thereby enables the user to operate any brand and model of vehicle without first having to adjust all the settings of the vehicle. Therefore, the smart card 125 allows the user to more easily adapt to vehicles he uses occasionally.

Figure 2:
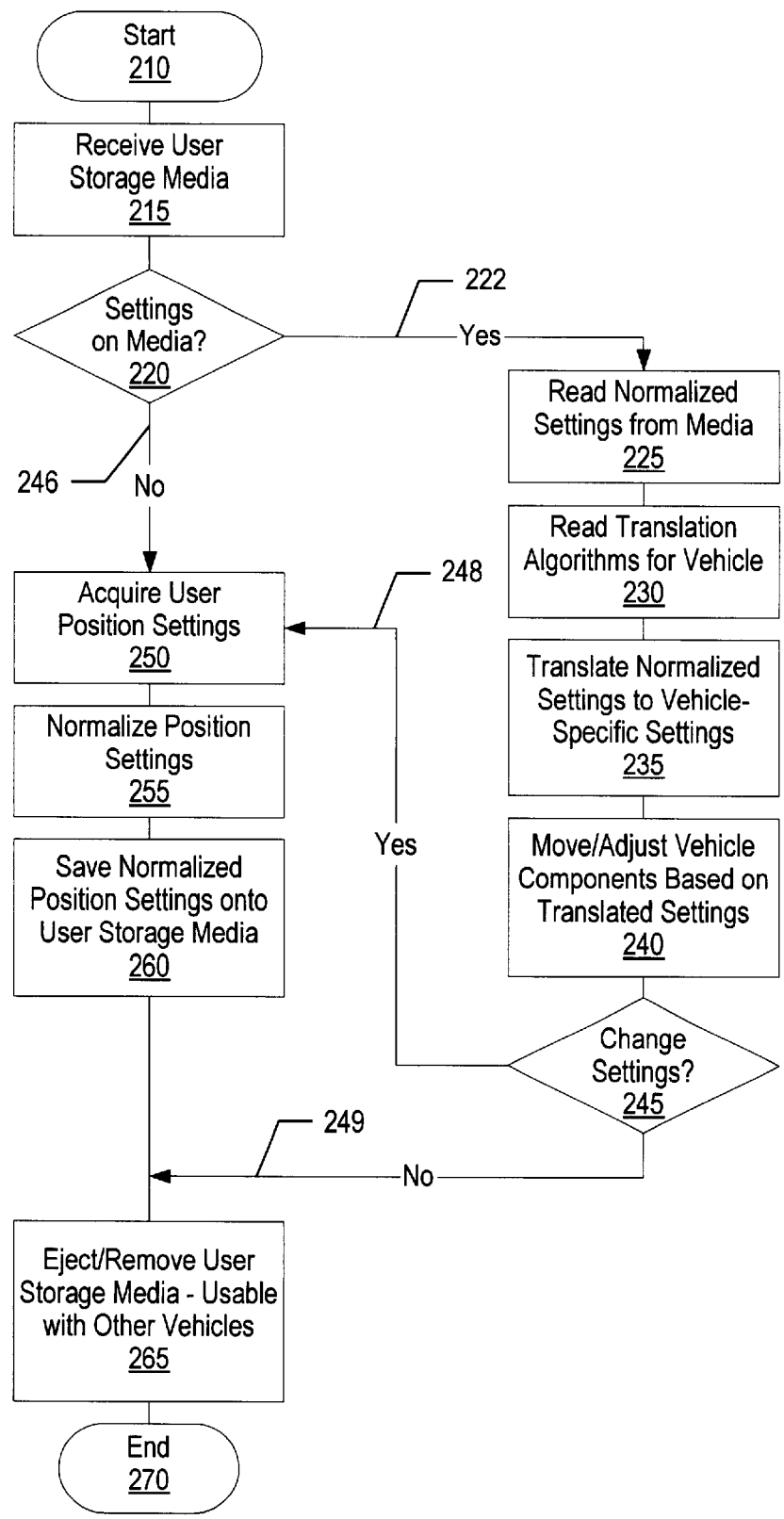
FIG. 2 is a high level flowchart showing normalized settings stored on a storage media being translated to vehicle-specific settings and vehicle components being adjusted based on the vehicle-specific settings.

FIG. 2 depicts a high level flowchart for adjusting the components of any brand and model of vehicle to vehicle-specific settings for a specific user of the vehicle. Processing commences at 210 whereupon the user storage media is received (step 215). The storage media may be any media capable of storing data. Examples of media that may be used are smart cards and key fobs. If normalized settings are stored on the storage media, decision 220 branches to "yes" branch 222 whereupon the normalized settings are read from the storage media. Translation algorithms are then read for the vehicle (step 230), followed by translating the normalized settings to vehicle-specific settings based on the translation algorithms (step 235). The vehicle components are moved or adjusted based on the translated settings (step 240). A determination is made as to whether the user is satisfied with the new settings or whether he would rather change the settings (decision 245). If the user has altered the settings, decision 245 branches to "yes" branch 248 whereupon steps 250, 255, and 260 are followed. On the other hand, if the user has not changed the settings, decision 245 branches to "no" branch 249 whereupon the user storage media is ejected or removed (step 265). The user storage media may be used again with other vehicles. Processing thereafter ends at 270

Returning to decision 220, if settings are not on the user storage media, decision 220 branches to "no" branch 246. The computer system acquires the user position settings, which are the settings selected by the user of the vehicle (step 250). Next, the user position settings are normalized (step 255). The normalized position settings are then stored onto the user storage media (step 260). These normalized position settings may be used to adjust the current vehicle components or stored until they can be used with other vehicles. The user storage media is removed (step 265), and processing thereafter ends (step 270).

Figure 3:
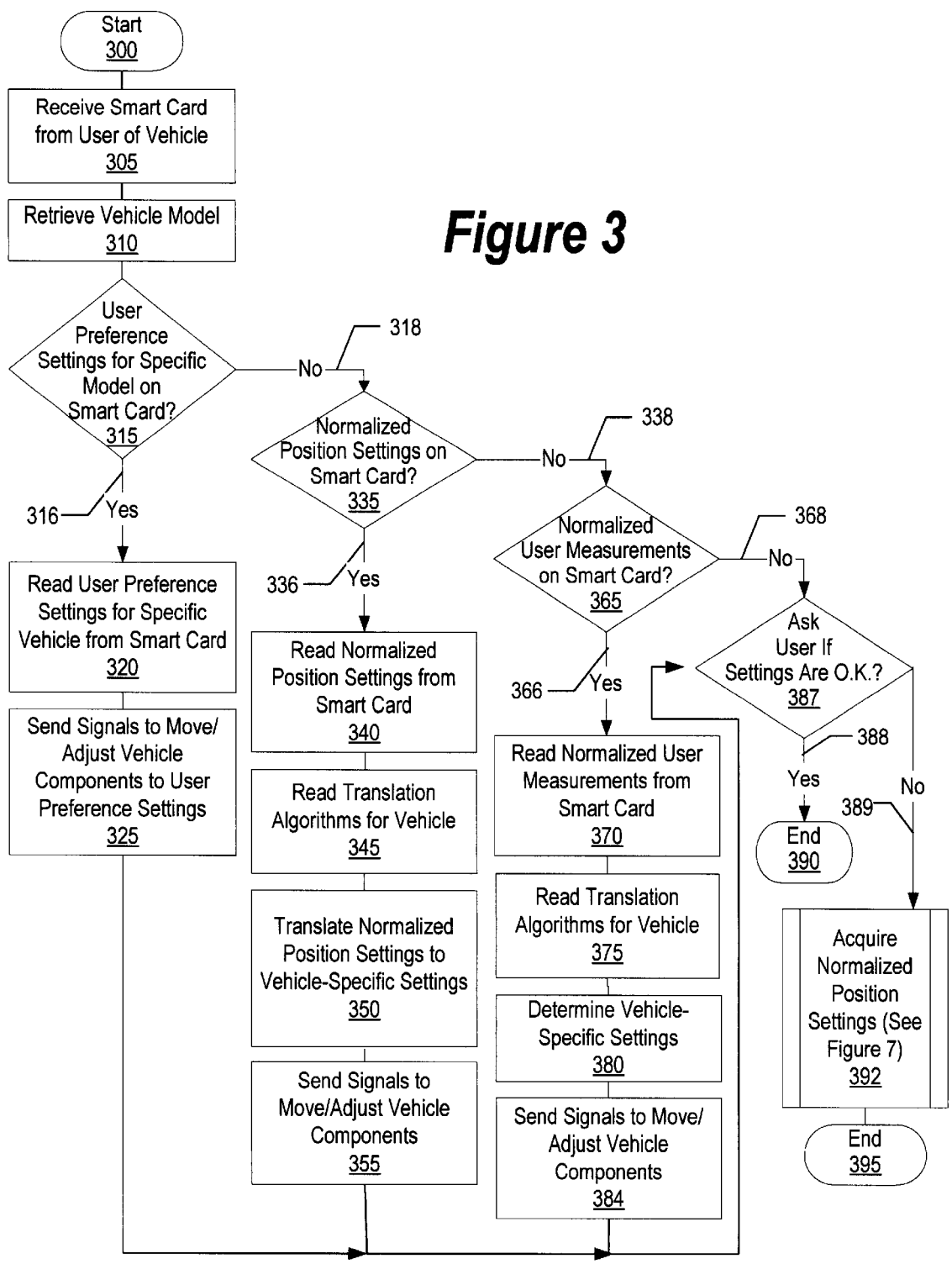
FIG. 3 is a flowchart showing the steps involved in determining the vehicle-specific settings for a user of a vehicle.

FIG. 3 shows a flowchart for determining the vehicle-specific settings for a user of a vehicle. The method illustrated by this flow diagram comprises several steps. The determination of the vehicle-specific settings commences at 300 whereupon the system receives a smart card from the user (step 305). The specific model of the current vehicle is then retrieved (step 310). Subsequently, a determination is made as to whether user preference settings for the specific model are stored on the smart card (step 315). These "user preference settings" are the user's preferred settings of the components in a specific vehicle model and thus do not apply to other vehicle models. The steps required to store such user preference settings to the smart card will be described later in detail. If the smart card contains user preference settings for the specific model of the current vehicle, decision 315 branches to "yes" branch 316. The user preference settings are subsequently read from the smart card (step 320), followed by the sending of signals to move or adjust the vehicle components to the user preference settings (step 325). The user is then asked whether the settings are O.K. (decision 387). If the user indicates that he finds the settings to be satisfactory, decision 387 branches to "yes" branch 388 whereupon processing ends at 390. However, if the user does not like the settings, decision 387 branches to "no" branch 389. At this point, the normalized position settings, the normalized user measurements, or the user preference settings for the current model are acquired (pre-defined process 392). Thereafter, processing ends at 395.

However, if user preference settings for the specific model are not present on the smart card, decision 315 branches to "no" branch 318 whereupon it is determined whether normalized position settings are stored on the smart card (decision 335). If this is the case, decision 335 branches to "yes" branch 336, and the normalized positions settings are read from the smart card (step 340). A method for determining the normalized position settings will be described later in detail. The normalized position settings provide reference points to which the actual settings in a vehicle may be compared. One normalized position setting might be, e.g., a point that is centered from the middle of the steering wheel when in a neutral or middle position and that is projected in a horizontal direction perhaps 18 inches from the steering wheel face.

Next, translation algorithms are read from the current vehicle (step 345). The following matrix manipulation is an example of the translation algorithm employed for this invention:

$$[\text{Vehicle} - \text{Specific Settings}] = [\text{Normalized Position Settings}] \times [\text{Model Deviations}]$$

The model deviations are the differences between the current model's position settings and the normalized position settings. The system uses the translation algorithms to translate the normalized position settings to vehicle-specific settings (step 350).

Subsequent to determining the vehicle-specific settings, the processor sends signals to move or adjust the vehicle components to those settings (step 355). The user is then asked whether the settings are O.K. (decision 387). If the user indicates that he finds the settings to be satisfactory, decision 387 branches to "yes" branch 388 whereupon processing ends at 390. However, if the user does not like the settings, decision 387 branches to "no" branch 389. At this point, the normalized position settings, the normalized user measurements, or the user preference settings for the current model are acquired (pre-defined process 392). Thereafter, processing ends at 395.

Returning to decision 335, if normalized position settings are not stored on the smart card, decision 335 branches to "no" branch 338. At this point, a determination is made as to whether normalized user measurements are stored on the smart card (step 365). If this is the case, the normalized user measurements are read from the smart card (step 370). A method for determining the normalized user measurements of the user's attributes will be described later in detail. Exemplary normalized user measurements might be that a person is 5'6" tall and weighs 150 pounds. Next, translation algorithms are read from the current vehicle (step 375). The system uses the translation algorithms to determine the vehicle-specific settings based on the normalized user measurements (step 380). Signals are then sent to move or adjust the vehicle components to the vehicle-specific settings (step 384). The user is then asked whether the settings are O.K. (decision 387). If the user indicates that he finds the settings to be satisfactory, decision 387 branches to "yes" branch 388 whereupon processing ends at 390. However, if the user does not like the settings, decision 387 branches to "no" branch 389. At this point, the normalized position settings, the normalized user measurements, or the user preference settings for the current model are acquired (pre-defined process 392). Thereafter, processing ends at 395.

Returning to decision 365, if normalized user measurements are not stored on the smart card, decision 365 branches to "no" branch 387 whereupon the user is asked if the settings are O.K. If the user indicates that he finds the settings to be satisfactory, decision. 387 branches to "yes" branch 388 whereupon processing ends at 390. However, if the user is dissatisfied with the settings, decision 387 branches to "no" branch 389. At this point, the normalized position settings, the normalized user measurements, or the user preference settings for the current model are acquired (step 392). Thereafter, processing ends at 395.

Figure 4:
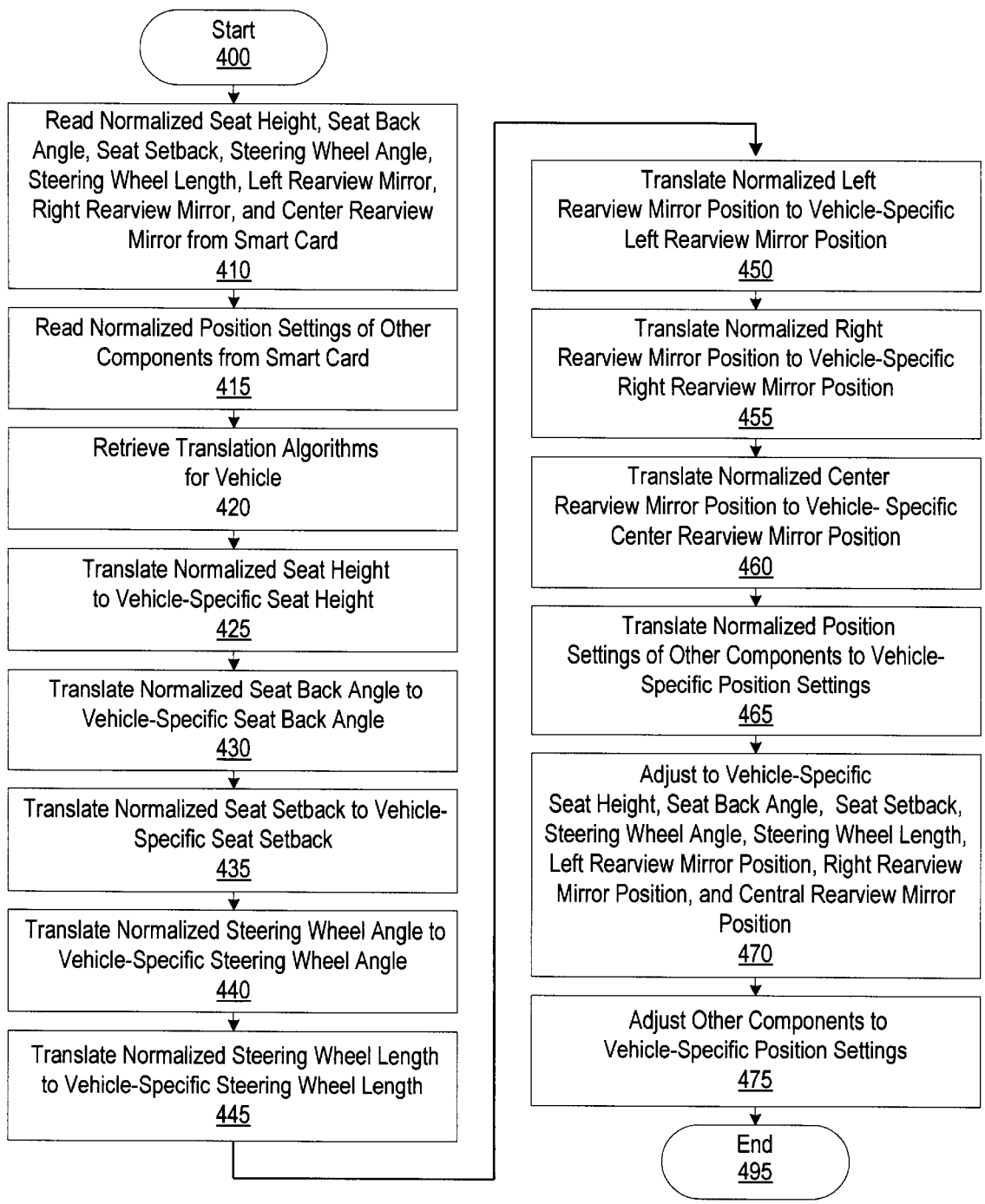
FIG. 4 is a flow diagram showing in detail the steps involved in translating the normalized position settings of the components of a vehicle to the vehicle-specific settings for a user of the vehicle.

FIG. 4 is a flow diagram showing in detail the steps involved in translating the normalized position settings of the components of a vehicle to the vehicle-specific settings for a user of the vehicle. Processing commences at 400 whereupon the normalized seat height, seat back angle, seat setback, steering wheel tilt angle, steering wheel length (telescopic distance pulled out from the base), left rearview mirror position, right rearview mirror position, and center rearview mirror position are read from the user's smart card (step 410). The normalized position settings of any other components in the vehicle are also read from the smart card (step 415).

Translation algorithms for the current vehicle are subsequently retrieved (step 420) and used for the following translations: the normalized seat height is translated to the vehicle-specific seat heat (step 425); the normalized seat back angle is translated to the vehicle-specific seat back angle (step 430); the normalized seat setback is translated to the vehicle-specific seat setback (step 435); the normalized steering wheel angle is translated to the vehicle-specific steering wheel angle (step 440); the normalized steering wheel length is translated to the vehicle-specific steering wheel length (step 445); the normalized left rearview mirror position is translated to the vehicle-specific rearview mirror position (step 450); the normalized right rearview mirror position is translated to the vehicle-specific right rearview mirror position (step 455); and the normalized center rearview mirror position is translated to the vehicle-specific center rearview mirror position (step 460). Next, the normalized position settings of the other components are translated to their vehicle-specific settings (step 465).

Finally, signals are sent to adjust the seat height, the seat back angle, the seat setback, the steering wheel angle, the steering wheel length, the left rearview mirror position, the right rearview mirror position, and the center rearview mirror position to their vehicle-specific settings (step 470). Furthermore, the other components are adjusted to their vehicle-specific settings (step 475). Processing thereafter ends at 495.

Figure 5:
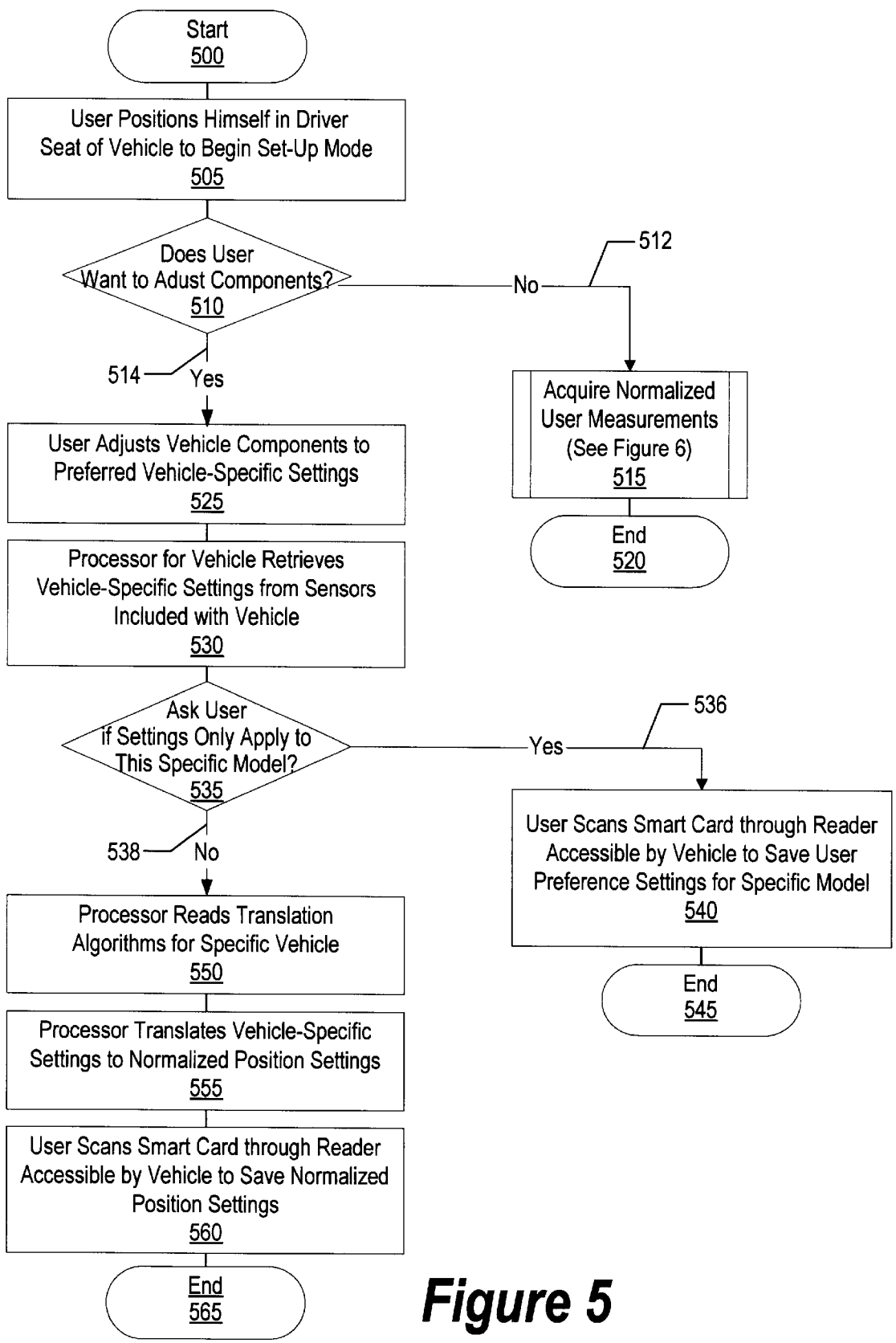
FIG. 5 is a flow diagram showing the steps involved in determining normalized position settings for use across different vehicles, user preference settings for use on a specific vehicle model, or normalized user measurements for use across different vehicles.
Figure 6:
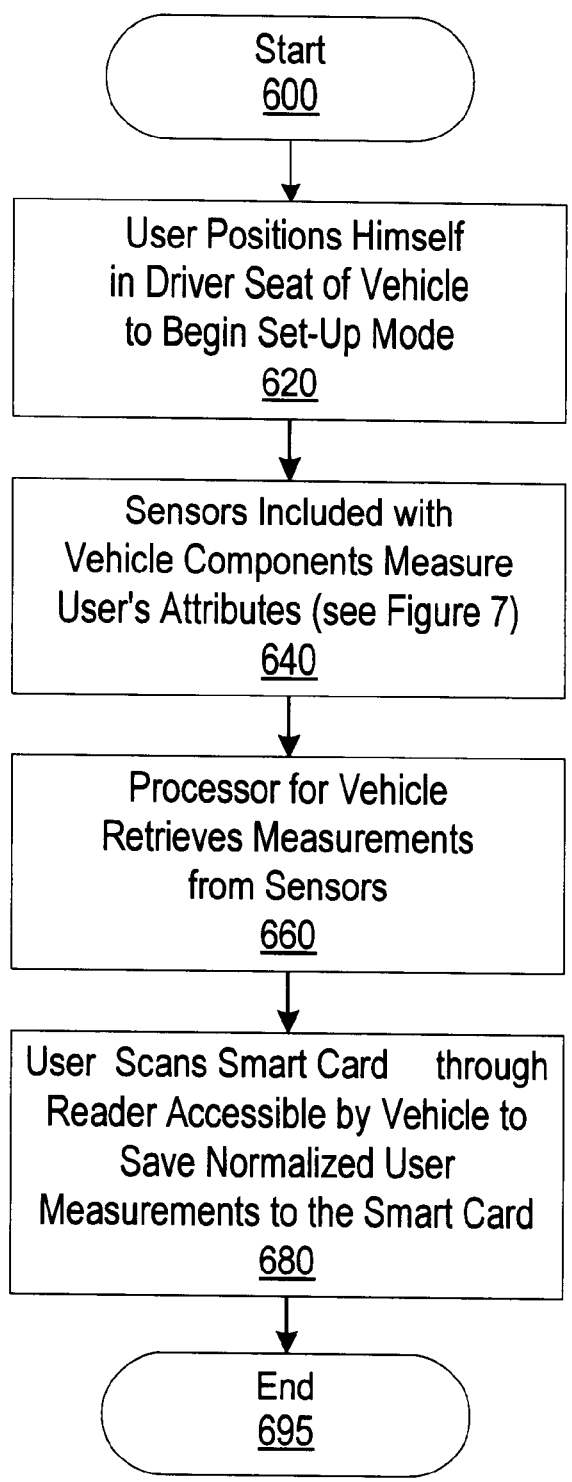
FIG. 6 is a flow diagram illustrating the detailed steps involved in determining the normalized user measurements.

FIG. 5 depicts a flow diagram showing the steps involved in determining normalized position settings for use across different vehicle brands and models. Processing commences at 500 whereupon the user positions himself in the driver seat of a reference vehicle (step 505). A determination is then made as to whether the user wants to manually adjust the vehicle components rather than having his measurements taken (decision 510). If the user does not want to adjust the vehicle components, decision 510 branches to "no" branch 512. At this point, normalized user measurements are acquired (pre-defined process 515) as shown in FIG. 6, and processing ends at 520. If, however, the user indicates he wants to adjust the vehicle components, decision 510 branches to "yes" branch 514 whereupon the user adjusts the vehicle components to preferred vehicle-specific settings (step 525). The processor then retrieves the vehicle-specific settings from sensors that may be located on the vehicle components (step 530).

Thereafter, the user is asked whether he wants the vehicle-specific settings to only be applied to the specific model of the current vehicle (decision 535). If this is the case, decision 353 branches to "yes" branch 536 whereupon the user scans his smart card through a reader accessible by the vehicle to save the settings as user preference settings for the specific model (step 540). Processing subsequently ends at 545. On the other hand, if the user does not want the current vehicle-specific settings to only be applied to the specific model but instead wants them to be applied across all models, decision 535 branches to "no" branch 538. At this point, the processor reads translation algorithms for the specific vehicle (step 550). Using the translation algorithms, the processor translates the vehicle-specific settings to normalized position settings (step 555). The user scans his smart card through a reader accessible by the vehicle to save the normalized position settings (step 560). Processing thereafter ends at 565.

Turning to FIG. 6, a flow diagram is depicted that illustrates the detailed steps involved in determining the normalized user measurements. The determination of user measurements commences at 600 whereupon the user positions himself in the driver seat of a reference vehicle (step 620). Sensors included with the vehicle measure the user's attributes (step 640), such as his arm length and his leg length. The processor for the vehicle thereafter retrieves the measurements from the sensors (step 660), and the user scans his smart card through a reader accessible by the vehicle to save normalized user measurements thereto (step 680). Processing ends at 695.

Figure 7:
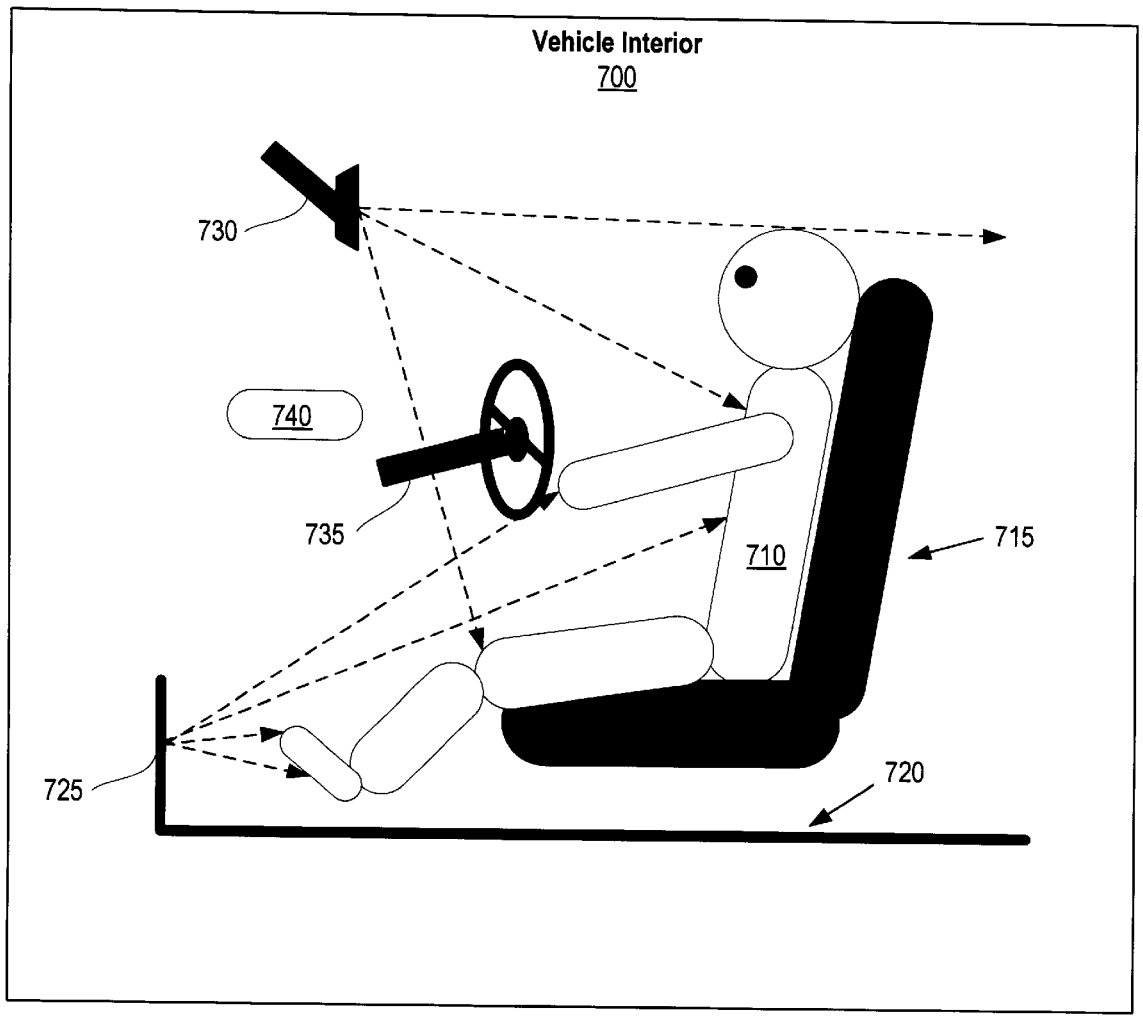
FIG. 7 is a side plan view of the attributes of a user of a vehicle being measured by sensors to determine the normalized user measurements.

FIG. 7 shows the attributes of a user of vehicle 700 being measured by sensors to determine the normalized user measurements. The vehicle user 710 is positioned in driver seat 715, which is located above the base of the vehicle 720. A measurement sensor that is capable of weighing user 710 may be disposed in the bottom of seat 715. A brake pedal 725 having a measurement sensor is attached to the front of the base 720. The rearview mirror 730 and steering wheel 735 also have measurement sensors. As shown by the arrows, the measurement sensors detect the locations of different points of the user's body, e.g., the top of the head, the top of a shoulder, the end of an arm, the center of the chest, the bottom of a foot, and the front of a foot. A processor 740 connected to the vehicle retrieves these locations from the sensors to determine the measurements of the user's attributes, including the height, weight, arm length, and leg length of user 710. Sensors may also be located on the vehicle components for detecting the current positions of those components.

Figure 8:
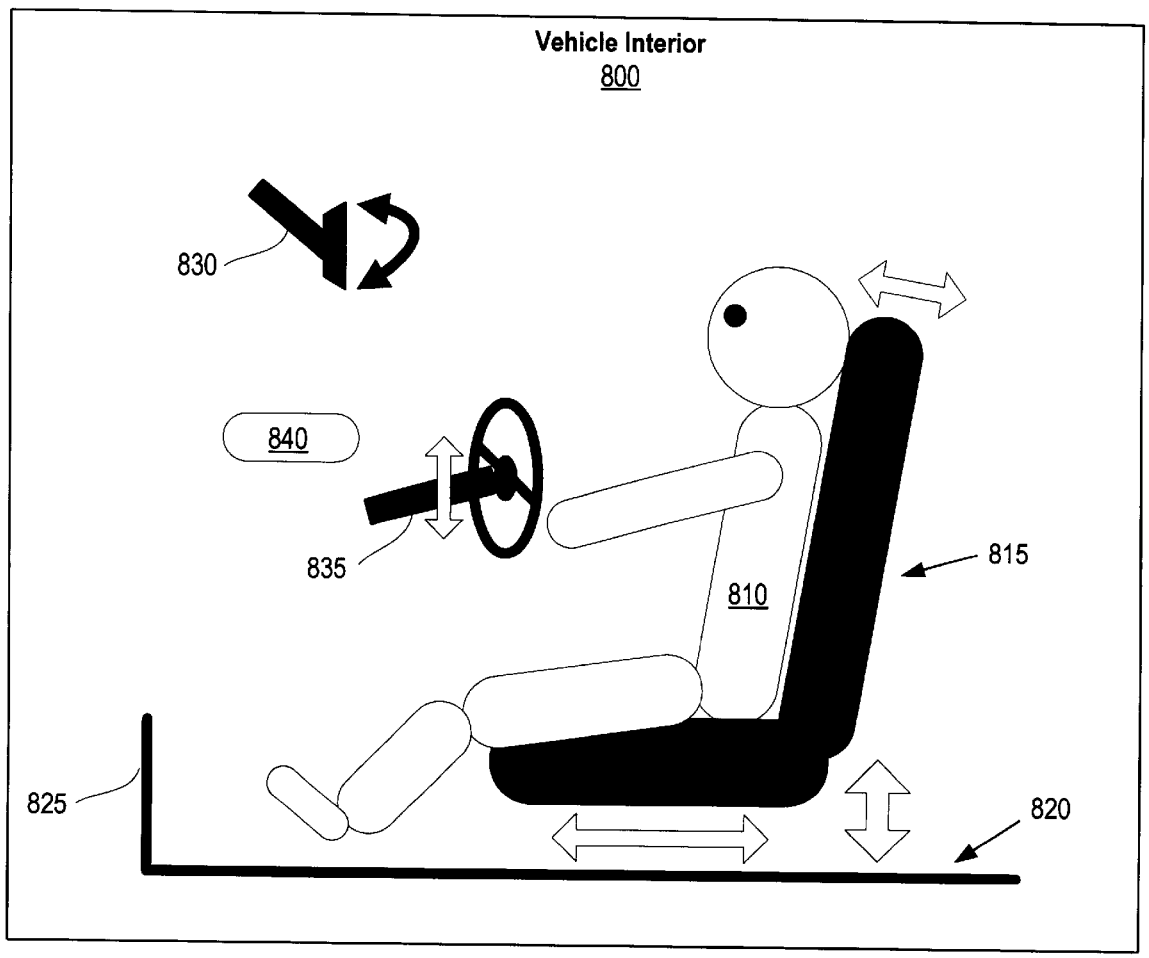
FIG. 8 is a side plan view of the vehicle components being adjusted to the vehicle-specific settings.

FIG. 8 shows the different components of vehicle 800 being adjusted to the vehicle-specific settings, which are determined as described above in FIG. 3. Processor 840 sends signals to adjust the tilt angle and length of steering wheel 835, thereby accommodating user 510. It also sends signals to move seat 815 up or down to the appropriate height and to move the back of seat 815 to the appropriate angle. Additionally, it sends signals to move the bottom of seat 815 forward or backward to the appropriate setback. Processor 840 further sends signals to adjust rearview mirror 830 to a position that provides user 810 with an excellent view. It is to be understood that the invention hereof contemplates the adjustment of vehicle components other than the ones depicted in FIG. 8.

While not shown in the drawings, this invention further contemplates determining the vehicle-specific settings for a passenger of a vehicle. In this case, the normalized position settings and normalized user measurements would be determined while the passenger is seated in the passenger seat most likely to be used by the passenger.

Figure 9:
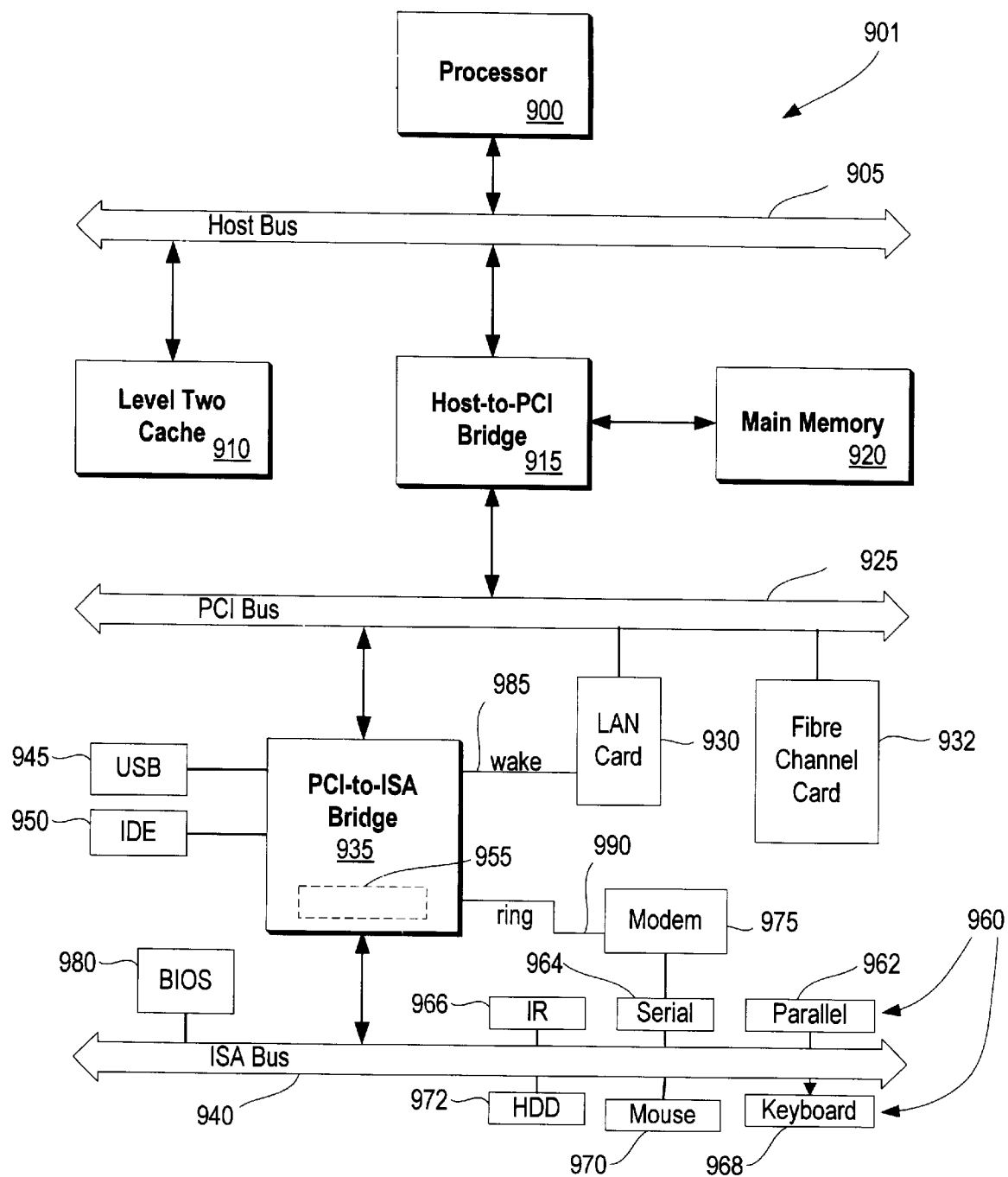
FIG. 9 is a block diagram of a computing device capable of implementing the translation of normalized position settings to vehicle-specific settings and vice-versa.

FIG. 9 illustrates information handling system 901 which is a simplified example of a computer system capable of performing the systems and methods described herein. Computer system 901 includes processor 900 that is coupled to host bus 905. A level two (L2) cache memory 910 is also coupled to the host bus 905. Host-to-PCI bridge 915 is coupled to main memory 920, includes cache memory and main memory control functions, and provides bus control to handle transfers among PCI bus 925, processor 900, L2 cache 910, main memory 920, and host bus 905. PCI bus 925 provides an interface for a variety of devices including, for example, LAN card 930. PCI-to-ISA bridge 935 provides bus control to handle transfers between PCI bus 925 and ISA bus 940, universal serial bus (USB) functionality 945, IDE device functionality 950, power management functionality 955, and can include other functional elements not shown, such as a real-time clock (RTC), DMA control, interrupt support, and system management bus support. Peripheral devices and input/output (I/O) devices can be attached to various interfaces 960 (e.g., parallel interface 962, serial interface 964, infrared (IR) interface 966, keyboard interface 968, mouse interface 970, and fixed disk (FDD) 972 coupled to ISA bus 940. Alternatively, many I/O devices can be accommodated by a super I/O controller (not shown) attached to ISA bus 940.

BIOS 980 is coupled to ISA bus 940 and incorporates the necessary processor executable code for a variety of low-level system functions and system boot functions. BIOS 980 can be stored in any computer readable medium, including magnetic storage media, optical storage media, flash memory, random access memory, read only memory, and communications media conveying signals encoding the instructions (e.g., signals from a network). In order to attach computer system 901 another computer system to copy files over a network, LAN card 930 is coupled to PCI-to-ISA bridge 935. Similarly, to connect computer system 901 to an ISP to connect to the Internet using a telephone line connection, modem 975 is connected to serial port 964 and PCI-to-ISA Bridge 935.

While the computer system described in FIG. 9 is capable of executing the processes described herein, this computer system is simply one example of a computer system. Those skilled in the art will appreciate that many other computer system designs are capable of performing the copying process described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for determining a vehicle-specific setting for a user of a vehicle, comprising:
   reading a normalized position setting from a storage medium;
   retrieving a translation algorithm corresponding to the vehicle;
   translating the normalized position setting to a vehicle-specific setting based on the translation algorithm; and
   sending a signal to move a vehicle component to the vehicle-specific setting.

2. The method of claim 1 wherein the normalized-position setting is selected from the group consisting of a normalized seat height, a normalized seat back angle, a normalized seat setback, a normalized steering wheel angle, a normalized steering wheel length, a normalized left rearview mirror, a normalized right rearview mirror, and a normalized center rearview mirror.

3. The method of claim 1 further comprising:
   inserting a removable storage medium in a storage device included in the vehicle;
   storing the normalized position settings on the removable storage medium;
   removing the removable storage medium from the storage device;
   inserting the removable storage medium in a second storage device located in a second vehicle;
   reading the normalized position settings from the removable storage medium;
   retrieving a second translation algorithm for the second vehicle;
   translating the normalized position setting to a second vehicle-specific setting based on the second translation algorithm; and
   sending a signal to move a second vehicle component in the second vehicle to the second vehicle-specific setting.

4. The method of claim 1 further comprising:
   reading one or more user measurements from the storage medium when the normalized position setting is absent from the storage medium; and
   determining the vehicle-specific setting based on the one or more normalized user measurements.

5. The method of claim 4 wherein the normalized user measurements are selected from the group consisting of the user's weight, the user's height, the user's arm length, the user's leg length, and the user's torso length.

6. The method of claim 1 wherein the storage medium is a removable storage medium adapted for insertion in storage devices located in a plurality of vehicle models.

7. A method for determining a vehicle-specific setting for a user of a vehicle, comprising:
   inserting a removable storage medium in a storage device attached to the vehicle;
   reading one or more user measurements from the removable storage medium;
   determining a vehicle-specific setting based on the user measurement; and
   adjusting a vehicle component based upon the vehicle-specific setting.

8. A method for determining a vehicle-specific setting for a user of a vehicle, comprising:
   inserting a removable storage medium in a first storage device included in a first vehicle;
   reading a normalized position setting from the removable storage medium;
   retrieving a translation algorithm corresponding to the first vehicle;
   translating the normalized position setting to a vehicle-specific setting based on the translation algorithm;
   moving a vehicle component to the vehicle-specific setting;
   receiving a request to adjust the vehicle-specific setting;
   translating the adjusted vehicle-specific setting to an adjusted normalized position;
   storing the adjusted normalized position setting on the removable storage medium;
   removing the removable storage medium from the first storage device;
   inserting the removable storage medium in a second storage device located in a second vehicle;
   reading the adjusted normalized position setting from the removable storage medium;
   retrieving a second translation algorithm corresponding to the second vehicle;
   translating the adjusted normalized position setting to a second vehicle-specific setting based on the second translation algorithm; and
   moving a second vehicle component in the second vehicle to the second vehicle-specific setting.

9. An information handling system comprising:
   one or more processors;
   a memory accessible by the processors;
   a nonvolatile storage device accessible by the processors and adapted to read a removable storage medium; and
   a translating tool for determining a vehicle-specific setting for a user of the vehicle, including:
      receiving logic for reading a normalized position setting from the removable storage medium;
      retrieval logic for retrieving a translation algorithm for the vehicle, the translation algorithm being stored in the nonvolatile storage area;
      translation logic for translating the normalized position setting to a vehicle-specific setting based on the translation algorithm; and
      automation logic for moving a vehicle component to the vehicle-specific setting.

10. The information handling system of claim 9, further comprising:

receiving logic for reading one or more user measurements from the removable storage medium when a normalized position setting is absent from the storage medium; and determination logic for determining the vehicle-specific setting based on the one or more user measurements.

11. The information handling system of claim 10, wherein the normalized user measurements are selected from the group comprising the user's weight, the user's height, the user's arm length, the user's leg length, and the user's torso length.

12. The information handling system of claim 9, wherein the normalized position setting is selected from the group consisting of a normalized seat height, a normalized seat back angle, a normalized seat setback, a normalized steering wheel angle, a normalized steering wheel length, a normalized left rearview mirror, a normalized right rearview mirror, and a normalized center rearview mirror.

13. The information handling system of claim 9 further comprising:

retrieval logic for retrieving a vehicle model identifier;

selection logic for selecting a model-specific preference setting on the removable storage medium that matches the vehicle model identifier; and automation logic for moving a vehicle component to the model-specific preference setting.

14. An information handling system comprising:

one or more processors;

a memory accessible by the processors;

a nonvolatile storage device accessible by the processors and adapted to read a removable storage medium; and a translating tool for determining a vehicle-specific setting for a user of the vehicle, including:

retrieval logic for retrieving a vehicle model identifier;

comparison logic for locating a model-specific setting stored on the removable storage medium that match the vehicle model identifier;

receiving logic for reading the model-specific setting from the removable storage medium in response to locating the model specific setting;

retrieval logic for retrieving a normalized position setting from the removable storage medium and retrieving a translation algorithm for the vehicle in response to not locating the model-specific settings;

translation logic for translating the normalized position setting to a vehicle-specific setting based on the translation algorithm in response to not locating the model-specific settings; and automation logic for moving a vehicle component to the model-specific setting in response to locating the model specific setting or to the normalized setting in response to not locating the model-specific settings.

15. A computer program product stored in a computer operable media for determining a vehicle-specific setting for a user of a vehicle, said computer program product comprising:

means for reading a normalized position setting from a storage medium;

means for retrieving a translation algorithm corresponding to the vehicle;

means for translating the normalized position setting to a vehicle-specific setting based on the translation algorithm; and means for sending a signal to move a vehicle component to the vehicle-specific setting.

16. The computer program product of claim 15 wherein the normalized position setting is selected from the group consisting of a normalized seat height, a normalized seat back angle, a normalized seat setback, a normalized steering wheel angle, a normalized steering wheel length, a normalized left rearview mirror, a normalized right rearview mirror, and a normalized center rearview mirror.

17. The computer program product of claim 15 further comprising:

means for inserting a removable storage medium in a storage device included in the vehicle;

means for storing the normalized position settings on the removable storage medium;

means for removing the removable storage medium from the storage device;

means for inserting the removable storage medium in a second storage device located in a second vehicle;

means for reading the normalized position settings from the removable storage medium;

means for retrieving a second translation algorithm for the second vehicle;

means for translating the normalized position setting to a second vehicle-specific setting based on the second translation algorithm; and means for sending a signal to move a second vehicle component in the second vehicle to the second vehicle-specific setting.

18. The computer program product of claim 15 further comprising:

means for reading one or more user measurements from the storage medium when the normalized position setting is absent from the storage medium; and means for determining the vehicle-specific setting based on the one or more normalized user measurements.

19. The computer program product of claim 18 wherein the normalized user measurements are selected from the group consisting of the user's weight, the user's height, the user's arm length, the user's leg length, and the user's torso length.

20. The computer program product of claim 15 wherein the storage medium is a removable storage medium adapted for insertion in storage devices located in a plurality of vehicle models.

21. A computer program product for determining a vehicle-specific setting for a user of a vehicle, comprising:

means for inserting a removable storage medium in a storage device attached to the vehicle;

means for reading one or more user measurements from the removable storage medium;

means for determining a vehicle-specific setting based on the user measurement; and means for adjusting a vehicle component based upon the vehicle-specific setting.

22. A computer program product for determining a vehicle-specific setting for a user of a vehicle, comprising:

means for inserting a removable storage medium in a first storage device included in a first vehicle;

means for reading a normalized position setting from the removable storage medium;

means for retrieving a translation algorithm corresponding to the first vehicle;

means for translating the normalized position setting to a vehicle-specific setting based on the translation algorithm;

means for moving a vehicle component to the vehicle-specific setting;

means for receiving a request to adjust the vehicle-specific setting;

means for translating the adjusted vehicle-specific setting to an adjusted normalized position;

means for storing the adjusted normalized position setting on the removable storage medium;

means for removing the removable storage medium from the first storage device;

means for inserting the removable storage medium in a second storage device located in a second vehicle;

means for reading the adjusted normalized position setting from the removable storage medium;

means for retrieving a second translation algorithm corresponding to the second vehicle;

means for translating the adjusted normalized position setting to a second vehicle-specific setting based on the second translation algorithm; and means for moving a second vehicle component in the second vehicle to the second vehicle-specific setting.

* * * * *